(12) United States Patent
Gupta et al.

(10) Patent No.: US 9,710,317 B2
(45) Date of Patent: Jul. 18, 2017

(54) METHODS TO IDENTIFY, HANDLE AND RECOVER FROM SUSPECT SSDS IN A CLUSTERED FLASH ARRAY

(71) Applicant: NetApp, Inc., Sunnyvale, CA (US)

(72) Inventors: Anish Gupta, Daly City, CA (US); Samiullah Mohammed, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 9 days.

(21) Appl. No.: 14/673,258

(22) Filed: Mar. 30, 2015

(65) Prior Publication Data

US 2016/0292025 A1    Oct. 6, 2016

(51) Int. Cl.
G06F 11/00 (2006.01)
G06F 11/07 (2006.01)
G06F 3/06 (2006.01)

(52) U.S. Cl.
CPC .......... *G06F 11/076* (2013.01); *G06F 3/0616* (2013.01); *G06F 3/0647* (2013.01);
(Continued)

(58) Field of Classification Search
USPC ....................................................... 714/47.2
See application file for complete search history.

(56) References Cited

U.S. PATENT DOCUMENTS 5,459,857 A    10/1995   Ludlam et al.
5,511,190 A     4/1996   Sharma et al.
(Continued)

FOREIGN PATENT DOCUMENTS

EP    0726521 A2   8/1996
EP    1970821 A1   9/2008
(Continued)

OTHER PUBLICATIONS

Cornwall, Michael, "Anatomy of a Solid-state Drive," ACM Queue—Networks, vol. 10, No. 10, Oct. 2012, pp. 1-7.
(Continued)

*Primary Examiner* — Amine Riad
(74) *Attorney, Agent, or Firm* — Cesari and McKenna, LLP

(57) ABSTRACT

A technique predicts failure of one or more storage devices of a storage array serviced by a storage system and for establishes one or more threshold conditions for replacing the storage devices. The predictive technique periodically monitors soft and hard failures of the storage devices (e.g., from Self-Monitoring, Analysis and Reporting Technology), as well as various usage counters pertaining to input/output (I/O) workloads and response times of the storage devices. A heuristic procedure may be performed that combines the monitored results to calculate the predicted failure and recommend replacement of the storage devices, using one or more thresholds based on current usage and failure patterns of the storage devices. In addition, one or more policies may be provided for replacing the storage devices in a cost-effective manner that ensures non-disruptive operation and/or replacement of the SSDs, while obviating a potential catastrophic scenario based on the usage and failure patterns of the storage devices.

18 Claims, 10 Drawing Sheets

(52) U.S. Cl.
CPC .......... *G06F 3/0653* (2013.01); *G06F 3/0688* (2013.01); *G06F 11/079* (2013.01); *G06F 11/0727* (2013.01); *G06F 11/0757* (2013.01); *G06F 11/0772* (2013.01); *G06F 11/0793* (2013.01)

(56) References Cited

U.S. PATENT DOCUMENTS

| | | |
|---|---|---|
| 5,937,425 A | 8/1999 | Ban |
| 5,991,862 A | 11/1999 | Ruane |
| 6,219,800 B1 | 4/2001 | Johnson et al. |
| 6,257,756 B1 | 7/2001 | Zarubinsky et al. |
| 6,275,898 B1 | 8/2001 | DeKoning |
| 6,347,337 B1 | 2/2002 | Shah et al. |
| 6,434,662 B1 | 8/2002 | Greene et al. |
| 6,526,478 B1 | 2/2003 | Kirby |
| 6,560,196 B1 | 5/2003 | Wei |
| 6,578,158 B1 | 6/2003 | Deitz et al. |
| 6,604,155 B1 | 8/2003 | Chong, Jr. |
| 6,609,176 B1 | 8/2003 | Mizuno |
| 6,704,839 B2 | 3/2004 | Butterworth et al. |
| 6,741,698 B1 | 5/2004 | Jensen |
| 6,779,003 B1 | 8/2004 | Midgley et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,928,526 B1 | 8/2005 | Zhu et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | Van Rietschote |
| 7,110,913 B2 | 9/2006 | Monroe et al. |
| 7,174,379 B2 | 2/2007 | Agarwal et al. |
| 7,188,149 B2 | 3/2007 | Kishimoto et al. |
| 7,191,357 B2 | 3/2007 | Holland et al. |
| 7,249,150 B1 | 7/2007 | Watanabe et al. |
| 7,251,663 B1 | 7/2007 | Smith |
| 7,257,690 B1 | 8/2007 | Baird |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,457,864 B2 | 11/2008 | Chambliss et al. |
| 7,464,125 B1 | 12/2008 | Orszag et al. |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan, IV et al. |
| 7,562,203 B2 | 7/2009 | Scott et al. |
| 7,603,391 B1 | 10/2009 | Federwisch et al. |
| 7,603,529 B1 | 10/2009 | MacHardy et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,701,948 B2 | 4/2010 | Rabje et al. |
| 7,743,035 B2 | 6/2010 | Chen et al. |
| 7,757,056 B1 | 7/2010 | Fair |
| 7,797,279 B1 | 9/2010 | Starling et al. |
| 7,814,064 B2 | 10/2010 | Vingralek |
| 7,818,525 B1 * | 10/2010 | Frost .................. G06F 12/0246 365/185.25 |
| 7,831,769 B1 | 11/2010 | Wen et al. |
| 7,849,098 B1 | 12/2010 | Scales et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,949,693 B1 | 5/2011 | Mason et al. |
| 7,987,167 B1 | 7/2011 | Kazar et al. |
| 7,996,636 B1 | 8/2011 | Prakash et al. |
| 8,060,797 B2 * | 11/2011 | Hida .................. G06F 11/1068 365/185.01 |
| 8,074,019 B2 | 12/2011 | Gupta et al. |
| 8,078,918 B2 * | 12/2011 | Diggs .................. G06F 11/008 714/42 |
| 8,082,390 B1 | 12/2011 | Fan et al. |
| 8,086,585 B1 | 12/2011 | Brashers et al. |
| 8,089,969 B2 | 1/2012 | Rabie et al. |
| 8,099,396 B1 | 1/2012 | Novick et al. |
| 8,099,554 B1 | 1/2012 | Solomon et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,489,811 B1 | 7/2013 | Corbett et al. |
| 8,495,417 B2 | 7/2013 | Jernigan, IV et al. |
| 8,520,855 B1 | 8/2013 | Kohno et al. |
| 8,539,008 B2 | 9/2013 | Faith et al. |
| 8,560,879 B1 | 10/2013 | Goel |
| 8,566,617 B1 | 10/2013 | Clifford |
| 8,583,865 B1 | 11/2013 | Sade et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,701 B1 | 4/2014 | Stefanov et al. |
| 8,732,426 B2 | 5/2014 | Colgrove et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,705 B2 | 8/2014 | Hallak et al. |
| 8,806,115 B1 | 8/2014 | Patel et al. |
| 8,806,160 B2 | 8/2014 | Colgrove et al. |
| 8,824,686 B1 | 9/2014 | Ishii et al. |
| 8,832,363 B1 | 9/2014 | Sundaram et al. |
| 8,832,373 B2 | 9/2014 | Colgrove et al. |
| 8,850,108 B1 | 9/2014 | Hayes et al. |
| 8,855,318 B1 | 10/2014 | Patnala et al. |
| 8,856,593 B2 | 10/2014 | Eckhardt et al. |
| 8,874,842 B1 | 10/2014 | Kimmel et al. |
| 8,880,787 B1 | 11/2014 | Kimmel et al. |
| 8,892,818 B1 | 11/2014 | Zheng et al. |
| 8,904,231 B2 | 12/2014 | Coatney et al. |
| 8,922,928 B2 | 12/2014 | Powell |
| 8,930,778 B2 * | 1/2015 | Cohen ................ G06F 11/2094 711/165 |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |

(56) References Cited

U.S. PATENT DOCUMENTS

| | | |
|---|---|---|
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,037,544 B1 | 5/2015 | Zheng et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,195,939 B1 | 11/2015 | Goyal et al. |
| 9,229,642 B2 * | 1/2016 | Shu .................. G06F 3/0616 |
| 9,256,549 B2 | 2/2016 | Kimmel et al. |
| 9,268,502 B2 | 2/2016 | Zheng et al. |
| 9,298,417 B1 | 3/2016 | Muddu et al. |
| 9,367,241 B2 | 6/2016 | Sundaram et al. |
| 9,389,958 B2 | 7/2016 | Sundaram et al. |
| 9,405,783 B2 | 8/2016 | Kimmel et al. |
| 9,459,856 B2 | 10/2016 | Curzi et al. |
| 9,471,680 B2 | 10/2016 | Elsner et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0156891 A1 | 10/2002 | Ulrich et al. |
| 2002/0174419 A1 | 11/2002 | Alvarez et al. |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0215792 A1 | 10/2004 | Koning et al. |
| 2004/0236846 A1 | 11/2004 | Alvarez et al. |
| 2005/0027817 A1 | 2/2005 | Novik et al. |
| 2005/0043834 A1 | 2/2005 | Rotariu et al. |
| 2005/0076113 A1 | 4/2005 | Klotz et al. |
| 2005/0076115 A1 | 4/2005 | Andrews et al. |
| 2005/0091261 A1 | 4/2005 | Wu et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0246362 A1 | 11/2005 | Borland |
| 2005/0246398 A1 | 11/2005 | Barzilai et al. |
| 2006/0004957 A1 | 1/2006 | Hand, III et al. |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0094452 A1 | 4/2007 | Fachan |
| 2007/0112723 A1 | 5/2007 | Alvarez et al. |
| 2007/0136269 A1 | 6/2007 | Yamakabe et al. |
| 2007/0143359 A1 | 6/2007 | Uppala |
| 2007/0186066 A1 | 8/2007 | Desai et al. |
| 2007/0186127 A1 | 8/2007 | Desai et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0266037 A1 | 11/2007 | Terry et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0165899 A1 | 7/2008 | Rahman et al. |
| 2008/0201535 A1 | 8/2008 | Hara |
| 2008/0244158 A1 | 10/2008 | Funatsu et al. |
| 2008/0250270 A1 | 10/2008 | Bennett |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0225657 A1 | 9/2009 | Haggar et al. |
| 2009/0271412 A1 | 10/2009 | Lacapra et al. |
| 2009/0276567 A1 | 11/2009 | Burkey |
| 2009/0285476 A1 | 11/2009 | Choe et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0077380 A1 | 3/2010 | Baker et al. |
| 2010/0082648 A1 | 4/2010 | Potapov et al. |
| 2010/0088296 A1 | 4/2010 | Periyagaram et al. |
| 2010/0122148 A1 * | 5/2010 | Flynn .................. G06F 11/108 714/773 |
| 2010/0161850 A1 | 6/2010 | Otsuka |
| 2010/0169415 A1 | 7/2010 | Leggette et al. |
| 2010/0174714 A1 | 7/2010 | Asmundsson et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2011/0022778 A1 | 1/2011 | Schibilla et al. |
| 2011/0035548 A1 | 2/2011 | Kimmel et al. |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 * | 4/2011 | Frame .................. G06F 12/023 711/162 |
| 2011/0099342 A1 | 4/2011 | Ozdemir |

(56) References Cited

U.S. PATENT DOCUMENTS

| | | | |
|---|---|---|---|
| 2011/0099419 A1* | 4/2011 | Lucas | G06F 11/073 714/6.32 |
| 2011/0126045 A1 | 5/2011 | Bennett | |
| 2011/0153719 A1 | 6/2011 | Santoro et al. | |
| 2011/0154103 A1* | 6/2011 | Bulusu | G06F 11/1658 714/6.23 |
| 2011/0161293 A1 | 6/2011 | Vermeulen et al. | |
| 2011/0161725 A1 | 6/2011 | Allen et al. | |
| 2011/0191389 A1 | 8/2011 | Okamoto | |
| 2011/0191522 A1 | 8/2011 | Condict et al. | |
| 2011/0213928 A1 | 9/2011 | Grube et al. | |
| 2011/0219106 A1 | 9/2011 | Wright | |
| 2011/0238857 A1 | 9/2011 | Certain et al. | |
| 2011/0246821 A1 | 10/2011 | Eleftheriou et al. | |
| 2011/0283048 A1 | 11/2011 | Feldman et al. | |
| 2011/0289565 A1 | 11/2011 | Resch et al. | |
| 2011/0296133 A1 | 12/2011 | Flynn et al. | |
| 2011/0307530 A1 | 12/2011 | Patterson | |
| 2011/0314346 A1 | 12/2011 | Vas et al. | |
| 2012/0003940 A1 | 1/2012 | Hirano et al. | |
| 2012/0011176 A1 | 1/2012 | Aizman | |
| 2012/0011340 A1 | 1/2012 | Flynn et al. | |
| 2012/0016840 A1 | 1/2012 | Lin et al. | |
| 2012/0063306 A1 | 3/2012 | Sultan et al. | |
| 2012/0072656 A1 | 3/2012 | Archak et al. | |
| 2012/0072680 A1 | 3/2012 | Kimura et al. | |
| 2012/0078856 A1 | 3/2012 | Linde | |
| 2012/0079318 A1 | 3/2012 | Colgrove et al. | |
| 2012/0084506 A1 | 4/2012 | Colgrove et al. | |
| 2012/0124282 A1 | 5/2012 | Frank et al. | |
| 2012/0136834 A1 | 5/2012 | Zhao | |
| 2012/0143877 A1 | 6/2012 | Kumar et al. | |
| 2012/0150869 A1 | 6/2012 | Wang et al. | |
| 2012/0150930 A1 | 6/2012 | Jin et al. | |
| 2012/0151118 A1 | 6/2012 | Flynn et al. | |
| 2012/0166715 A1 | 6/2012 | Frost et al. | |
| 2012/0166749 A1 | 6/2012 | Eleftheriou et al. | |
| 2012/0185437 A1 | 7/2012 | Pavlov et al. | |
| 2012/0197844 A1 | 8/2012 | Wang et al. | |
| 2012/0221828 A1 | 8/2012 | Fang et al. | |
| 2012/0239869 A1 | 9/2012 | Chiueh et al. | |
| 2012/0243687 A1 | 9/2012 | Li et al. | |
| 2012/0246129 A1 | 9/2012 | Rothschild et al. | |
| 2012/0246392 A1 | 9/2012 | Cheon | |
| 2012/0290788 A1 | 11/2012 | Klemm et al. | |
| 2012/0303876 A1 | 11/2012 | Benhase et al. | |
| 2012/0310890 A1 | 12/2012 | Dodd et al. | |
| 2012/0311246 A1 | 12/2012 | McWilliams et al. | |
| 2012/0311290 A1 | 12/2012 | White | |
| 2012/0317084 A1 | 12/2012 | Liu | |
| 2012/0317338 A1 | 12/2012 | Yi et al. | |
| 2012/0317353 A1 | 12/2012 | Webman et al. | |
| 2012/0317395 A1 | 12/2012 | Segev et al. | |
| 2012/0323860 A1 | 12/2012 | Yasa et al. | |
| 2012/0324150 A1 | 12/2012 | Moshayedi et al. | |
| 2013/0007097 A1 | 1/2013 | Sambe et al. | |
| 2013/0010966 A1 | 1/2013 | Li et al. | |
| 2013/0013654 A1 | 1/2013 | Lacapra et al. | |
| 2013/0018854 A1 | 1/2013 | Condict | |
| 2013/0019057 A1 | 1/2013 | Stephens | |
| 2013/0042065 A1 | 2/2013 | Kasten et al. | |
| 2013/0060992 A1 | 3/2013 | Cho et al. | |
| 2013/0073519 A1 | 3/2013 | Lewis et al. | |
| 2013/0073821 A1 | 3/2013 | Flynn et al. | |
| 2013/0080679 A1 | 3/2013 | Bert | |
| 2013/0086006 A1 | 4/2013 | Colgrove et al. | |
| 2013/0086270 A1 | 4/2013 | Nishikawa et al. | |
| 2013/0110783 A1 | 5/2013 | Wertheimer et al. | |
| 2013/0110845 A1 | 5/2013 | Dua | |
| 2013/0124776 A1 | 5/2013 | Hallak et al. | |
| 2013/0138616 A1 | 5/2013 | Gupta et al. | |
| 2013/0138862 A1 | 5/2013 | Motwani et al. | |
| 2013/0166724 A1 | 6/2013 | Bairavasundaram et al. | |
| 2013/0166727 A1 | 6/2013 | Wright et al. | |
| 2013/0166861 A1 | 6/2013 | Takano et al. | |
| 2013/0185719 A1 | 7/2013 | Kar et al. | |
| 2013/0219048 A1 | 8/2013 | Arvidsson et al. | |
| 2013/0226877 A1 | 8/2013 | Nagai et al. | |
| 2013/0227111 A1 | 8/2013 | Wright et al. | |
| 2013/0227195 A1 | 8/2013 | Beaverson et al. | |
| 2013/0227201 A1 | 8/2013 | Talagala et al. | |
| 2013/0227236 A1 | 8/2013 | Flynn et al. | |
| 2013/0232261 A1 | 9/2013 | Wright et al. | |
| 2013/0238832 A1 | 9/2013 | Dronamraju et al. | |
| 2013/0238876 A1 | 9/2013 | Fiske et al. | |
| 2013/0238932 A1 | 9/2013 | Resch | |
| 2013/0262805 A1 | 10/2013 | Zheng et al. | |
| 2013/0268497 A1 | 10/2013 | Baldwin et al. | |
| 2013/0275656 A1 | 10/2013 | Talagala et al. | |
| 2013/0290263 A1 | 10/2013 | Beaverson et al. | |
| 2013/0305002 A1 | 11/2013 | Hallak et al. | |
| 2013/0311740 A1* | 11/2013 | Watanabe | G06F 3/061 711/165 |
| 2013/0332688 A1 | 12/2013 | Corbett et al. | |
| 2013/0346700 A1 | 12/2013 | Tomlinson et al. | |
| 2013/0346720 A1 | 12/2013 | Colgrove et al. | |
| 2013/0346810 A1 | 12/2013 | Kimmel et al. | |
| 2014/0006353 A1 | 1/2014 | Chen et al. | |
| 2014/0013068 A1 | 1/2014 | Yamato et al. | |
| 2014/0052764 A1 | 2/2014 | Michael et al. | |
| 2014/0068184 A1 | 3/2014 | Edwards et al. | |
| 2014/0082255 A1 | 3/2014 | Powell | |
| 2014/0082273 A1 | 3/2014 | Segev | |
| 2014/0089683 A1 | 3/2014 | Miller et al. | |
| 2014/0095758 A1 | 4/2014 | Smith et al. | |
| 2014/0101115 A1 | 4/2014 | Ko et al. | |
| 2014/0108350 A1 | 4/2014 | Marsden | |
| 2014/0108797 A1 | 4/2014 | Johnson et al. | |
| 2014/0149647 A1 | 5/2014 | Guo et al. | |
| 2014/0172811 A1 | 6/2014 | Green | |
| 2014/0181370 A1 | 6/2014 | Cohen et al. | |
| 2014/0185615 A1 | 7/2014 | Ayoub et al. | |
| 2014/0195480 A1 | 7/2014 | Talagala et al. | |
| 2014/0195564 A1 | 7/2014 | Talagala et al. | |
| 2014/0208003 A1 | 7/2014 | Cohen et al. | |
| 2014/0215129 A1 | 7/2014 | Kuzmin et al. | |
| 2014/0215170 A1 | 7/2014 | Scarpino et al. | |
| 2014/0244962 A1 | 8/2014 | Arges et al. | |
| 2014/0258681 A1 | 9/2014 | Prasky et al. | |
| 2014/0279917 A1 | 9/2014 | Minh et al. | |
| 2014/0279931 A1 | 9/2014 | Gupta et al. | |
| 2014/0281055 A1 | 9/2014 | Davda et al. | |
| 2014/0297980 A1 | 10/2014 | Yamazaki | |
| 2014/0310231 A1 | 10/2014 | Sampathkumaran et al. | |
| 2014/0310373 A1 | 10/2014 | Aviles et al. | |
| 2014/0325117 A1 | 10/2014 | Canepa et al. | |
| 2014/0325147 A1 | 10/2014 | Nayak | |
| 2014/0344222 A1 | 11/2014 | Morris et al. | |
| 2014/0379965 A1 | 12/2014 | Gole et al. | |
| 2015/0019792 A1 | 1/2015 | Swanson et al. | |
| 2015/0032928 A1 | 1/2015 | Andrews et al. | |
| 2015/0058577 A1 | 2/2015 | Earl | |
| 2015/0066852 A1 | 3/2015 | Beard et al. | |
| 2015/0085665 A1 | 3/2015 | Kompella et al. | |
| 2015/0085695 A1 | 3/2015 | Ryckbosch et al. | |
| 2015/0089138 A1 | 3/2015 | Tao et al. | |
| 2015/0095555 A1 | 4/2015 | Asnaashari et al. | |
| 2015/0106556 A1 | 4/2015 | Yu et al. | |
| 2015/0112939 A1 | 4/2015 | Cantwell et al. | |
| 2015/0120754 A1 | 4/2015 | Chase et al. | |
| 2015/0127922 A1 | 5/2015 | Camp et al. | |
| 2015/0134926 A1 | 5/2015 | Yang et al. | |
| 2015/0193338 A1 | 7/2015 | Sundaram et al. | |
| 2015/0205663 A1 | 7/2015 | Sundaram et al. | |
| 2015/0220402 A1 | 8/2015 | Cantwell et al. | |
| 2015/0242478 A1 | 8/2015 | Cantwell et al. | |
| 2015/0244795 A1 | 8/2015 | Cantwell et al. | |
| 2015/0261446 A1 | 9/2015 | Lee | |
| 2015/0286438 A1 | 10/2015 | Simionescu et al. | |
| 2015/0324264 A1* | 11/2015 | Chinnakkonda Vidyapoornachary | G06F 11/108 714/6.11 |
| 2015/0339194 A1 | 11/2015 | Kalos et al. | |

(56) References Cited

U.S. PATENT DOCUMENTS

| | | |
|---|---|---|
| 2015/0378613 A1 | 12/2015 | Koseki |
| 2016/0070480 A1 | 3/2016 | Babu et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0139838 A1 | 5/2016 | D'Sa et al. |
| 2016/0179410 A1 | 6/2016 | Haas et al. |
| 2016/0248583 A1 | 8/2016 | McClanahan et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2012132943 A1 | 10/2012 |

OTHER PUBLICATIONS

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Hwang, Kai et al., "RAID-x: A New Distributed Disk Array for I/O-centric Cluster Computing", IEEE High-Performance Distributed Computing, Aug. 2000, pp. 279-286.

Leventhal, Adam H., "A File System All its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

Agrawal, et al., "Design Tradeoffs for SSD Performance," USENIX Annual Technical Conference, 2008, 14 Pages.

Alvaraez C., "NetApp Deduplication for FAS and V-Series Deployment and Implementation Guide," Technical Report TR-3505, 2011, 71 pages.

Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.

Arpaci-Dusseau R., et al., "Log-Structured File Systems," Operating Systems: Three Easy Pieces published by Arpaci-Dusseau Books, May 25, 2014, 15 pages.

Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.

Ben-Yehuda et al., "The Price of Safety: Evaluating IOMMU Performance," Proceedings of the Linux Symposium, vol. 1, Jun. 27-30, 2007, pp. 9-20.

Bitton D. et al., "Duplicate Record Elimination in Large Data Files," Oct. 26, 1999, 11 pages.

Bogaerdt, "cdeftutorial," http://oss.oetiker.ch/rrdtool/tut/cdeftutorial.en.html Date obtained from the internet, Sep. 9, 2014, 14 pages.

Bogaerdt, "Rates, Normalizing and Consolidating," http://www.vandenbogaerdl.nl/rrdtool/process.php Date obtained from the internet: Sep. 9, 2014, 5 pages.

Bogaerdt, "rrdtutorial," http://oss.oetiker.ch/rrdtool/lul/rrdtutorial.en.html Date obtained from the internet, Sep. 9, 2014, 21 pages.

Chris K., et al., "How many primes are there?" Nov. 2001. https://web.archive.org/web/20011120073053/http://primes.utm.edu/howmany.shtml.

Debnath, et al., "ChunkStash: Speeding up in line Storage Deduplication using Flash Memory," USENIX, USENIXATC '10, Jun. 2010, 15 pages.

Fan, et al., "MemC3: Compact and Concurrent MemCache with Dumber Caching and Smarter Hashing," USENIX NSDI '13, Apr. 2013, pp. 371-384.

Final Office Action mailed Dec. 2, 2015, for U.S. Appl. No. 14/684,956, filed Apr. 13, 2015, 12 pages.

Final Office Action mailed Dec. 22, 2015, for U.S. Appl. No. 13/857,008, filed Apr. 4, 2013, 10 pages.

Final Office Action mailed Dec. 4, 2013, for U.S. Appl. No. 13/856,997, filed Apr. 4, 2013, 25 pages.

Final Office Action mailed Dec. 4, 2015, for U.S. Appl. No. 14/454,197, filed Aug. 7, 2014, 11 pages.

Final Office Action mailed Feb. 16, 2016, for U.S. Appl. No. 14/186,847, filed Feb. 21, 2014, 25 pages.

Final Office Action mailed Feb. 2, 2016, for U.S. Appl. No. 13/856,958, filed Apr. 4, 2013, 18 pages.

Final Office Action mailed Feb. 6, 2014, for U.S. Appl. No. 13/856,958, filed Apr. 4, 2013, 16 pages.

Final Office Action mailed Mar. 2, 2016 for U.S. Appl. No. 14/701,832, filed May 1, 2015, 16 pages.

Final Office Action mailed May 13, 2013, for U.S. Appl. No. 13/041,122, filed Mar. 4, 2011, 22 pages.

Final Office Action mailed Nov. 25. 2015, for U.S. Appl. No. 14/684,966, filed Apr. 13, 2015, 21 pages.

Gulati et al., "Basil: Automated IO Load Balancing Across Storage Devices," Proceedings of the 8th USENIX Conference on File and Storage Technologies, FAST'10, Berkeley, CA, USA, 2010, 14 pages.

INTEL, Product Specification- Intel® Solid-State Drive DC S3700, Jun. 2013, 32 pages.

International Search Report and Written Opinion for Application No. PCT/EP2014/071446 mailed on Apr. 1, 2015, 14 pages.

International Search Report and Written Opinion for Application No. PCT/US2012/071844 mailed Mar. 1, 2013, 12 pages.

International Search Report and Written Opinion for Application No. PCT/US2014/035284 mailed on Apr. 1, 2015, 8 pages.

International Search Report and Written Opinion for Application No. PCT/US2014/055138 mailed on Dec. 12, 2014, 13 pages.

International Search Report and Written Opinion for Application No. PCT/US2014/058728 mailed on Dec. 16, 2014, 11 pages.

International Search Report and Written Opinion for Application No. PCT/US2014/060031 mailed on Jan. 26, 2015, 9 pages.

International Search Report and Written Opinion for Application No. PCT/US2014/071446 mailed on Apr. 1, 2015, 13 pages.

(56) References Cited

OTHER PUBLICATIONS

International Search Report and Written Opinion for Application No. PCT/US2014/071465 mailed on Mar. 25, 2015, 12 pages.
International Search Report and Written Opinion for Application No. PCT/US2014/071484 mailed on Mar. 25, 2015, 9 pages.
International Search Report and Written Opinion for Application No. PCT/US2014/071581 mailed on Apr. 10, 2015, 9 pages.
International Search Report and Written Opinion for Application No. PCT/US2014/071635 mailed on Mar. 31, 2015, 13 pages.
International Search Report and Written Opinion for Application No. PCT/US2015/016625 mailed on Sep. 17, 2015, 8 pages.
International Search Report and Written Opinion for Application No. PCT/US2015/021285 mailed Jun. 23, 2015, 8 pages.
International Search Report and Written Opinion for Application No. PCT/US2015/024067 mailed Jul. 8, 2015, 7 pages.
International Search Report and Written Opinion for Application No. PCT/US2015/048800 mailed on Nov. 25, 2015, 11 pages.
International Search Report and Written Opinion for Application No. PCT/US2015/048833 mailed on Nov. 25, 2015, 11 pages.
International Search Report and Written Opinion for Application No. PCT/US2015/056932 mailed on Jan. 21, 2016, 11 pages.
International Search Report and Written Opinion for Application No. PCT/US2015/057532 mailed on Feb. 9, 2016, 12 pages.
Kagel A.S, "two-way merge sort," Dictionary of Algorithms and Data Structures [online], retrieved on Jan. 28, 2015, Retrieved from the Internet :< URL: http://xlinux.nist.gov/dads/HTMUlwowaymrgsrl.html>, May 2005, 1 page.
Lamport L., "The Part-Time Parliament," ACM Transactions on Computer Systems, May 1998, vol. 16 (2), pp. 133-169.
Metreveli et al. "CPHash: A Cache-Partitioned Hash Table." Nov. 2011. https://people.csail.mit.edu/nickolai/papers/metrevelicphash-tr.pdf.
Non-Final Office Action mailed Aug. 12, 2015, for U.S. Appl. No. 14/684,929, filed Apr. 13, 2015, 20 pages.
Non-Final Office Action mailed Aug. 13, 2015, for U.S. Appl. No. 13/856,958, filed Apr. 4, 2013, 15 pages.
Non-Final Office Action mailed Aug. 13, 2015, for U.S. Appl. No. 14/186,847, filed Feb. 21, 2014, 20 pages.
Non-Final Office Action mailed Aug. 21, 2013, for U.S. Appl. No. 13/856,997, filed Apr. 4, 2013, 19 pages.
Non-Final Office Action mailed Aug. 7, 2015, for U.S. Appl. No. 14/684,894, filed Apr. 13, 2015, 10 pages.
Non-Final Office Action mailed Dec. 5, 2012, for U.S. Appl. No. 13/041,122, filed Mar. 4, 2011, 21 pages.
Non-Final Office Action mailed Jan. 29, 2016, for U.S. Appl. No. 14/454,197, filed Aug. 7, 2014, 11 pages.
Non-Final Office Action mailed Jul. 1, 2015, for U.S. Appl. No. 13/857,008, filed Apr. 4, 2013, 10 pages.
Non-Final Office Action mailed Jul. 14, 2015, for U.S. Appl. No. 14/454,197, filed Aug. 7, 2014, 5 pages.
Non-Final Office Action mailed Jul. 14, 2015, for U.S. Appl. No. 14/684,956, filed Apr. 13, 2015, 5 pages.
Non-Final Office Action mailed Jul. 14. 2015, for U.S. Appl. No. 14/684,966, filed Apr. 13, 2015, 21 pages.
Non-Final Office Action mailed Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action mailed Jul. 31, 2015 for U.S. Appl. No. 14/259,467, filed Apr. 23, 2014, 10 pages.
Non-Final Office Action mailed Jul. 31, 2015 for U.S. Appl. No. 14/684,942 filed Apr. 13, 2015, 4 pages.
Non-Final Office Action mailed Jun. 17 2013, for U.S. Appl. No. 13/041,095, filed Mar. 4, 2011, 10 pages.
Non-Final Office Action mailed Jun. 30, 2015, for U.S. Appl. No. 14/057,145, filed Oct. 18, 2015, 21 pages.
Non-Final Office Action mailed Mar. 31, 2016, for U.S. Appl. No. 14/941,938.

Non-Final Office Action mailed Oct. 19, 2015, for U.S. Appl. No. 14/701,832, filed May 1, 2015, 11 pages.
Non-Final Office Action mailed on Jan. 26, 2016 for U.S. Appl. No. 14/932,063, filed Nov. 4, 2015, 9 pages.
Non-Final Office Action mailed Sep. 10, 2014, for U.S. Appl. No. 13/338,039, filed Dec. 27, 2011, 10 pages.
Notice Allowance mailed Jan. 21, 2016, for U.S. Appl. No. 14/684,894, filed Apr. 13, 2015, 13 pages.
Notice of Allowance mailed Apr. 14, 2015, for U.S. Appl. No. 13/856,997, filed Apr. 4, 2013, 18 pages.
Notice of Allowance mailed Apr. 24, 2014, for U.S. Appl. No. 13/041,122 filed Mar. 4, 2011, 14 pages.
Notice of Allowance mailed Aug. 24, 2016, for U.S. Appl. No. 14/684,956, filed Apr. 13, 2015, 4 pages.
Notice of Allowance mailed Aug. 27, 2015 for U.S. Appl. No. 14/684,914, filed Apr. 13, 2015, 10 pages.
Notice of Allowance mailed Dec. 8, 2014, for U.S. Appl. No. 13/338,039, filed Dec. 27, 2011, 7 pages.
Notice of Allowance mailed Feb. 22, 2016, for U.S. Appl. No. 14/057,145, filed Oct. 18, 2015, 12 pages.
Notice of Allowance mailed Mar. 29, 2016, for U.S. Appl. No. 14/454,197, filed Aug. 7, 2014, 7 pages.
Notice of Allowance mailed May 4, 2016 for U.S. Appl. No. 14/932,063, filed Nov. 4, 2015, 7 pages.
Notice of Allowance mailed Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en. html, Date obtained from the internet: Sep. 9, 2014, 5 pages.
Oetiker, "rrdtool," http ://loss. oetiker.ch/rrdtool/doc/rrdtool.en. html Date obtained from the internet: Sep. 9, 2014, 5 pages.
O'Neil P., at al., "The Log-structured Merge-tree (lsm-tree)," Acta Informatica, 33, 1996, pp. 351-385.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Sears., et al., "Blsm: A General Purpose Log Structured Merge Tree," Proceedings of the 2012 ACM SIGMOD International Conference on Management, 2012, 12 pages.
Stoica et al. "Chord: A Scalable Peer-to-peer Lookup Service for Internet Applications." Aug. 2001. ACM. SIGCOMM '01.
Supplementary European Search Report for Application No. EP12863372 mailed on Jul. 16, 2015, 7 pages.
Texas Instruments, User Guide, TMS320C674x/OMAP-L1 x Processor Serial ATA (SATA) Controller, Mar. 2011, 76 Pages.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.

* cited by examiner

METHODS TO IDENTIFY, HANDLE AND RECOVER FROM SUSPECT SSDS IN A CLUSTERED FLASH ARRAY

BACKGROUND

Technical Field

The present disclosure relates to storage systems and, more specifically, to predictive replacement of storage devices of a storage system.

Background Information

A storage system typically includes a storage array having one or more storage devices into which information may be entered, and from which the information may be obtained, as desired. The storage devices may include hard disk drives (HDDs) embodied as magnetic disk devices having mechanically wearing components (e.g., spindles and moving magnetic heads) and solid state drives (SSDs) embodied as flash storage devices having electronically wearing components. For example, some types of SSDs, especially those with NAND flash components, may be configured with erasable pages or segments, each of which may have a limited endurance, i.e., a limited number of erase cycles, before being unable to store data reliably. Wear-leveling may be employed to address this limitation by arranging the information so that erasure and rewrite operations are distributed evenly across components of the devices. In addition, usage patterns pertaining to input/output (I/O) workloads serviced by the storage system may target substantially all of the SSDs of the array so as to further distribute the information evenly among the drives.

However, such even distribution of operations and workloads may cause wear-out of the SSDs to occur at approximately the same time, thereby leading to a potentially catastrophic failure scenario, i.e., deterioration of redundancy and loss of data. Such even wear-out is unusual for HDDs, which typically have one or two disk failures occur at a time. In addition, HDD-based errors (e.g., typically based on mechanical failures) may be reported differently and have different error pattern characteristics than SSD-based errors. As such, a predictive failure technique to detect and replace storage media likely to fail as a group at approximately the same time, is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein provide a technique for predicting failure of one or more storage devices, such as solid state drives (SSDs), of a storage array serviced by a storage system (node) and for establishing one or more threshold conditions for replacing the SSDs of the storage array. To that end, the predictive technique periodically monitors soft and hard failures of the SSDs (e.g., from Self-Monitoring, Analysis and Reporting Technology), as well as various usage counters pertaining to input/output (I/O) workloads and response times of the SSDs. A heuristic procedure may then be performed that combines the monitored results to calculate the predicted failure and recommend replacement of the SSDs using one or more thresholds based on current usage and failure patterns of the SSDs. In addition, one or more policies may be provided for replacing the SSDs of the storage array in a cost-effective manner that ensures non-disruptive operation and/or replacement of the SSDs, while obviating a potential catastrophic scenario based on the usage and failure patterns of the SSDs, e.g., deterioration of redundancy resulting in data loss. As for the latter, the predictive technique may provide a "warning" to enable replacement of the SSDs prior to such catastrophic failure while maintaining an expected level of reliability for data stored in the storage array. That is, an alert indicating replacement of SSDs is provided prior to a catastrophic failure such that an expected level of redundancy is maintained for the storage array.

DESCRIPTION

Storage Cluster

Figure 1:
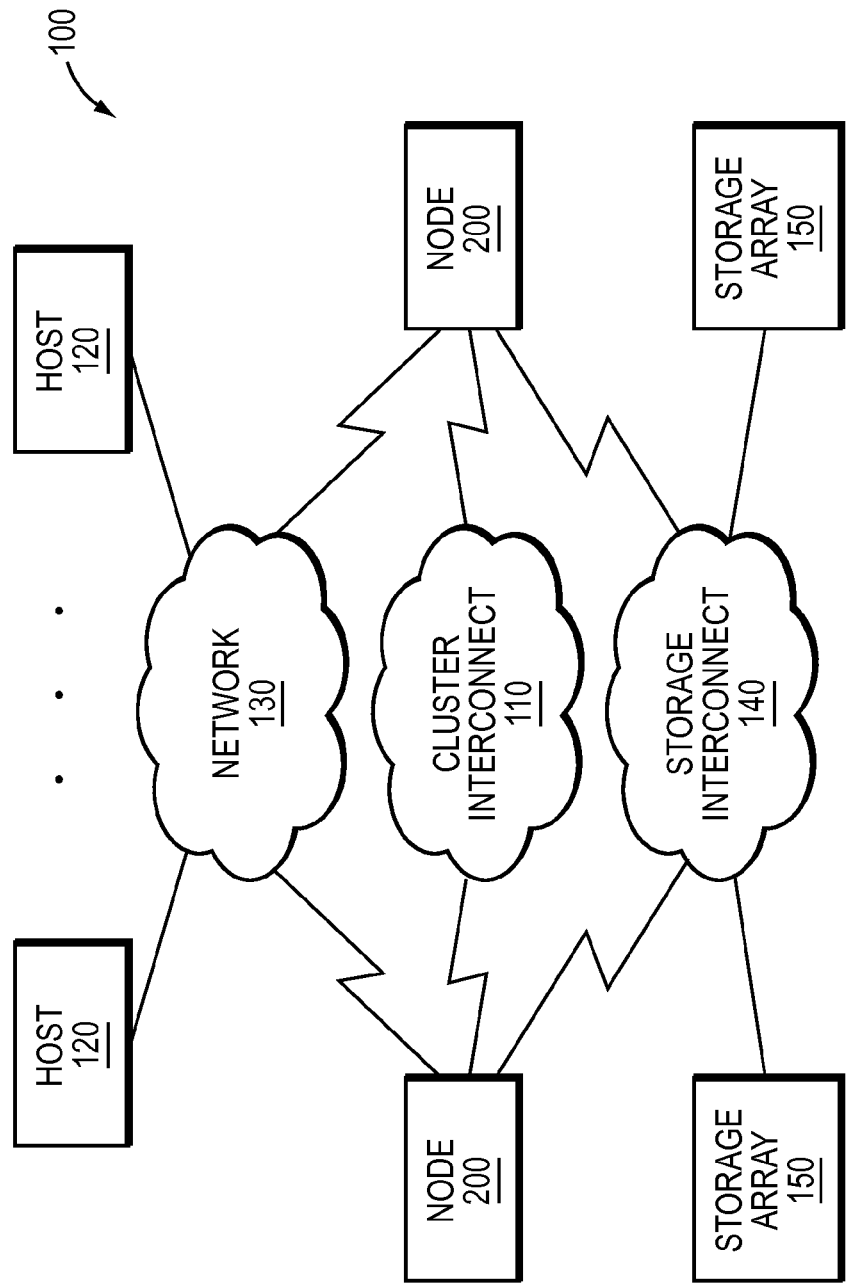
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
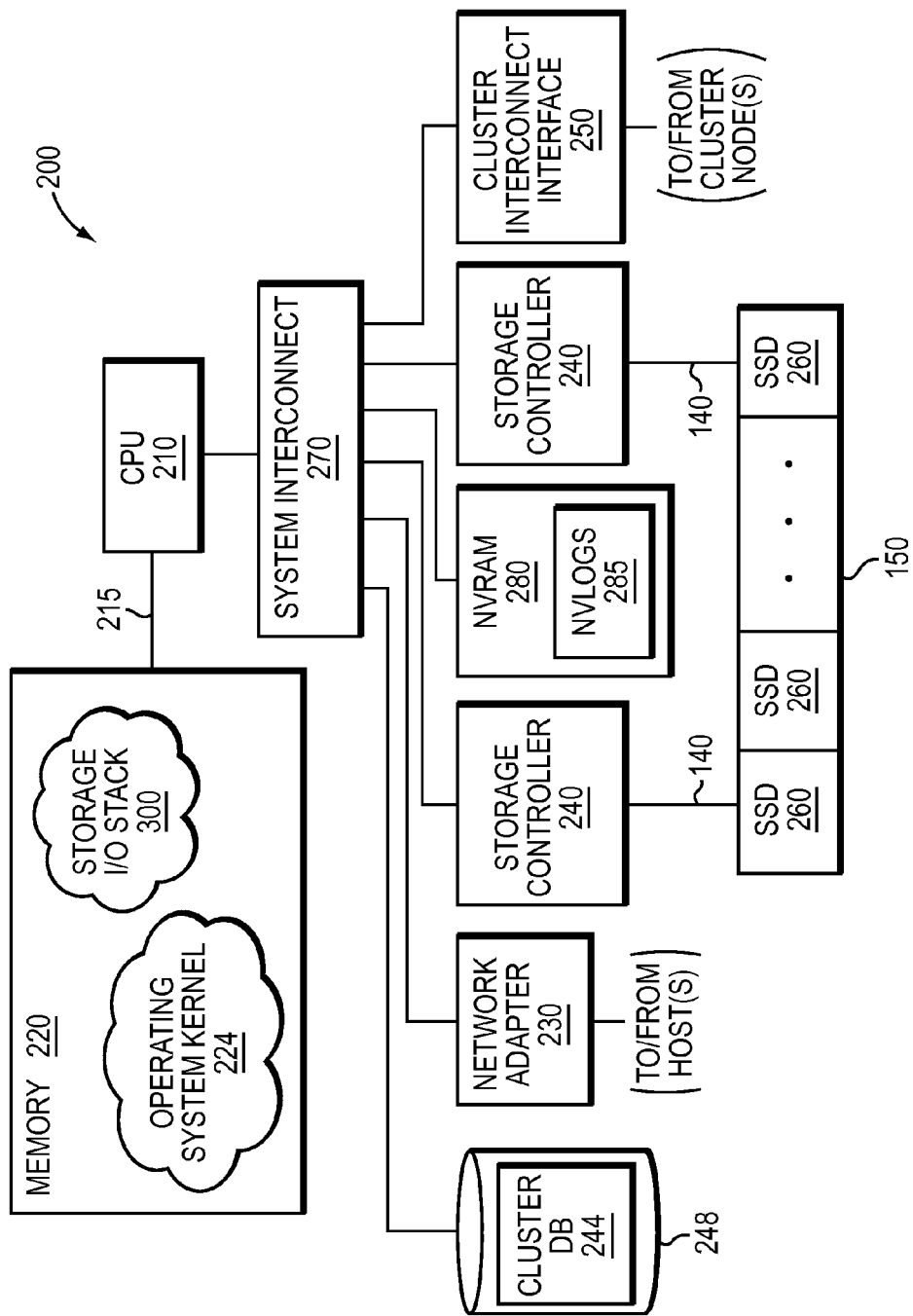
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a conventional serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
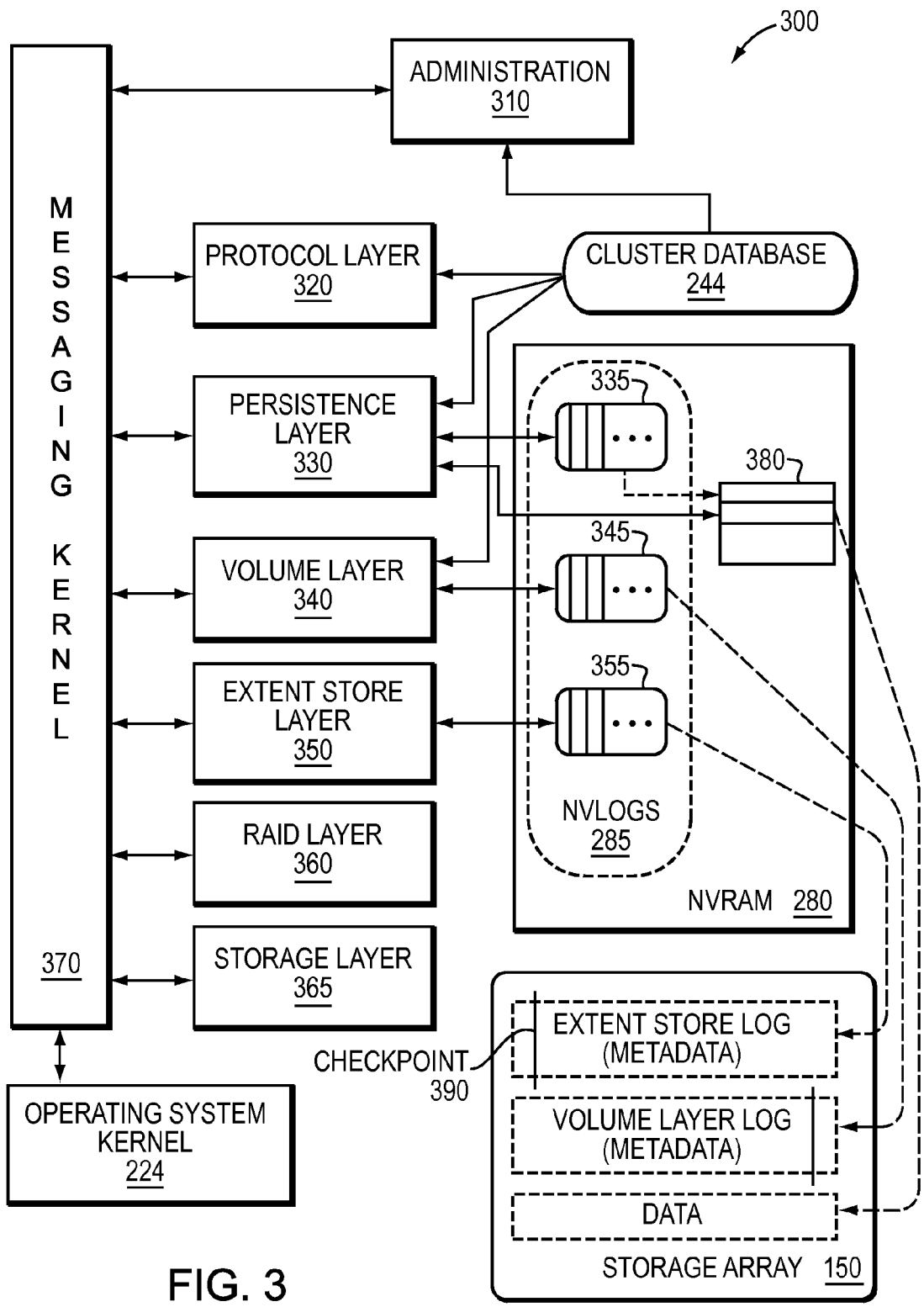
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations.

In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
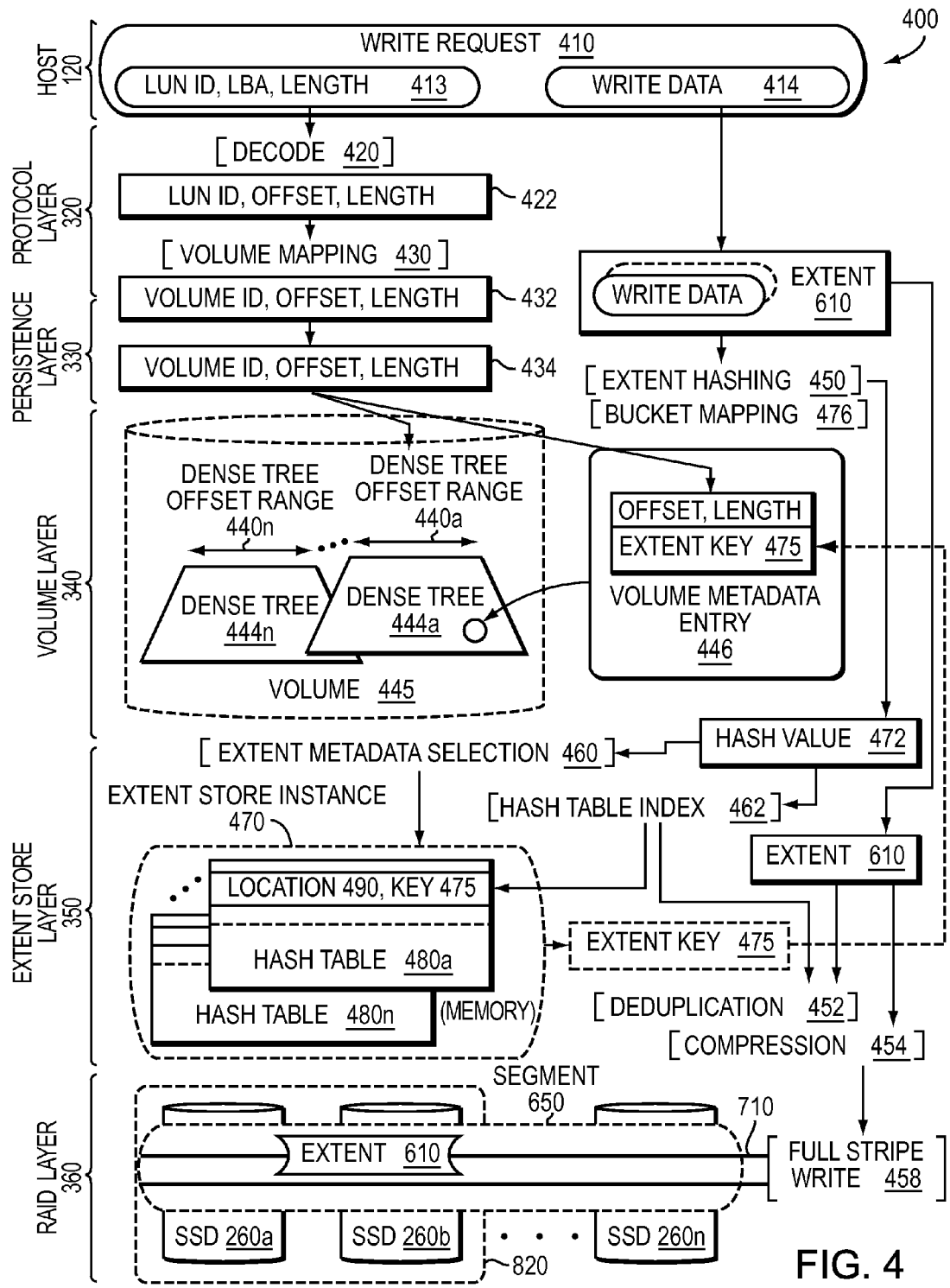
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 470) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 470, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 460 that (i) selects an appropriate hash table 480 (e.g., hash table 480a) from a set of hash tables (illustratively in-core) within the extent store instance 470, and (ii) extracts a hash table index 462 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 460 described herein. If a table entry with a matching extent key is found, then the SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 480n) may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 710 of RAID group 820. The extent store instance may cooperate with the RAID layer 360 to identify a storage segment 650 (i.e., a portion of the storage array 150) and a location on SSD 260 within the segment 650 in which to store the new extent 610. Illustratively, the identified storage segment is a segment with a large contiguous free space having, e.g., location 490 on SSD 260b for storing the extent 610.

In an embodiment, the RAID layer 360 then writes the stripes 710 across the RAID group 820, illustratively as one or more full stripe writes 458. The RAID layer 360 may write a series of stripes 710 of sufficient depth to reduce data relocation that may occur within the flash-based SSDs 260 (i.e., flash block management). The extent store instance then (i) loads the SSD location 490 of the new extent 610 into the selected hash table 480n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer 345. Accordingly, the I/O (write) request is sufficiently stored on SSD 260 of the cluster.

Read Path

Figure 5:
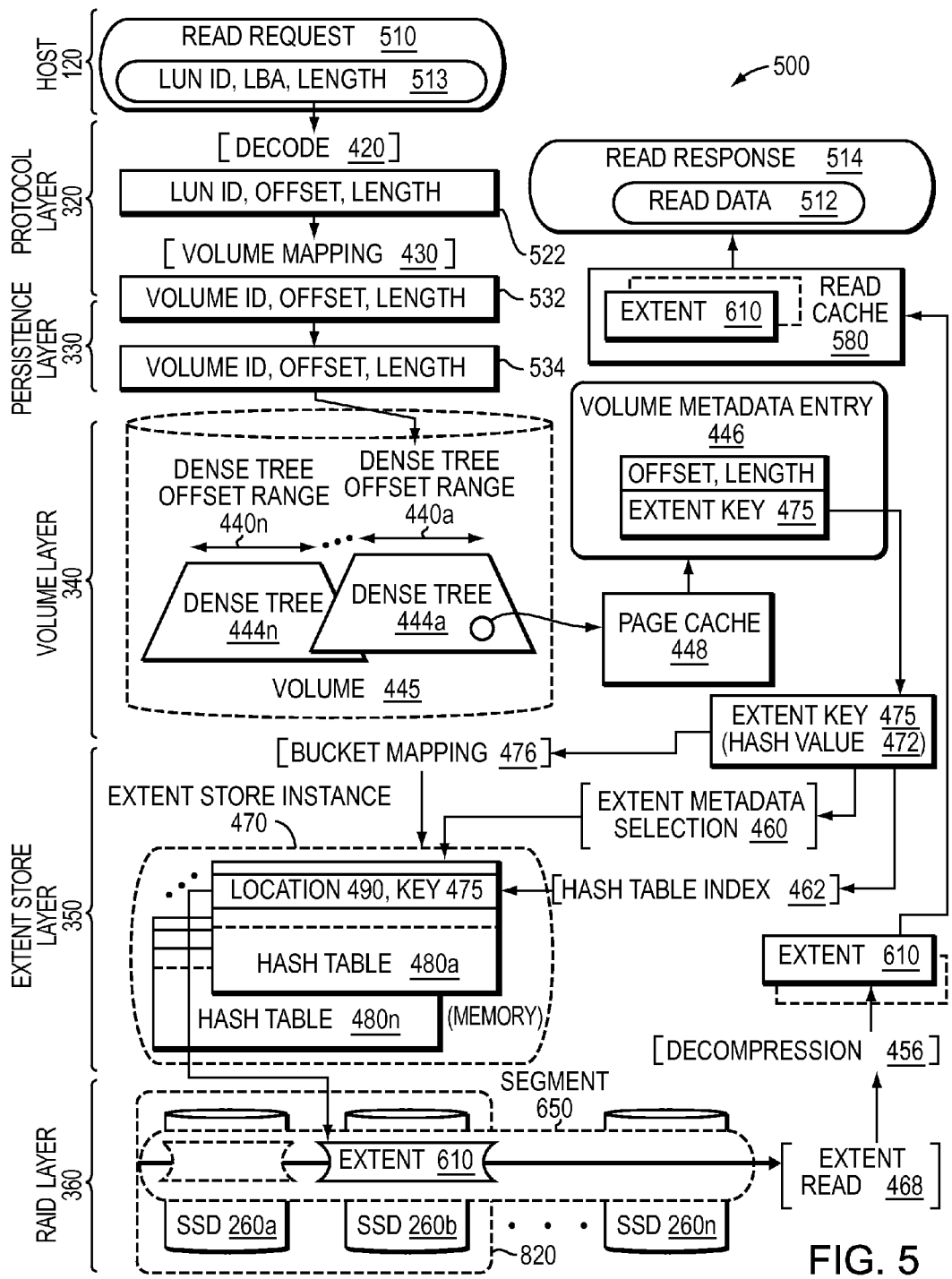
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism, (e.g., RPC, for inter-node communication) or the IPC mechanism, (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If not metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 470 responsible for storing the requested extent 610. Note that, in an embodiment, each extent key 475 may be substantially identical to the hash value 472 associated with the extent 610, i.e., the hash value as calculated during the write request for the extent, such that the bucket mapping 476 and extent metadata selection 460 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 470 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 460 that (i) selects an appropriate hash table 480 (e.g., hash table 480a) from a set of hash tables within the extent store instance 470, and (ii) extracts a hash table index 462 from the extent key 475 (i.e., hash value 472) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups, whereas flash device management may include segment cleaning to create such free segments that indirectly map to the SSDs. Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

Segment Cleaning

Figure 6:
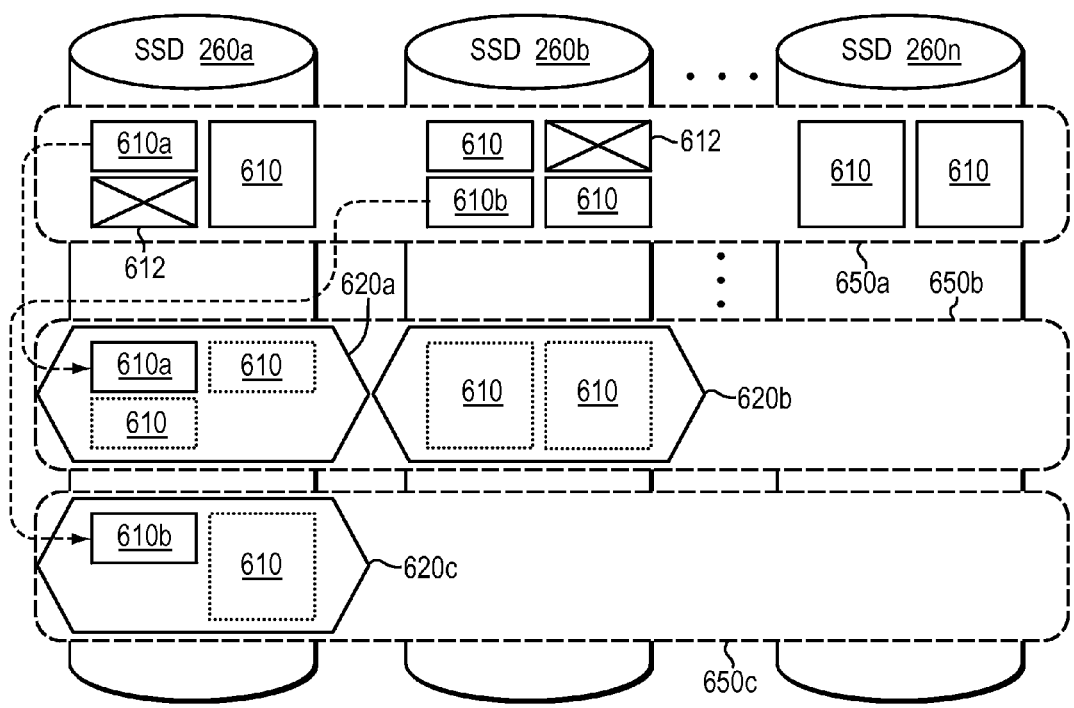
FIG. 6 illustrates segment cleaning by a layered file system of the storage I/O stack.

FIG. 6 illustrates segment cleaning by the layered file system. In an embodiment, the extent store layer 350 of the layered file system may write extents to an empty or free region or "segment." Before rewriting that segment again, the extent store layer 350 may clean the segment in accordance with segment cleaning which, illustratively, may be embodied as a segment cleaning process. The segment cleaning process may read all valid extents 610 from an old segment 650a and write those valid extents (i.e., extents not deleted or overwritten 612) to one or more new segments 650b-c, to thereby free-up (i.e., "clean") the old segment 650a. New extents may then be written sequentially to the old (now clean) segment. The layered file system may maintain a certain amount of reserve space (i.e., free segments) to enable efficient performance of segment cleaning. For example, the layered file system may illustratively maintain a reserve space of free segments equivalent to approximately 7% of storage capacity. The sequential writing of new extents may manifest as full stripe writes 458, such that a single write operation to storage spans all SSDs in a RAID group 820. Write data may be accumulated until a stripe write operation of a minimum depth can be made.

Illustratively, segment cleaning may be performed to free one or more selected segments that indirectly map to SSDs. As used herein, a SSD may be composed of a plurality of segment chunks 620, wherein each chunk is illustratively approximately 1 GB in size. A segment may include a segment chunk 620a-c from each of a plurality of SSDs in a RAID group 820. Thus, for a RAID group having 24 SSDs, wherein 22 SSDs store data (data SSDs) and 2 SSDs store parity (parity SSDs), each segment may include 22 GB of data and 2 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to underlying flash blocks by reducing performance impacts of the FTL. Once a segment is cleaned and designated freed, data may be written sequentially to that segment. Accounting structures, e.g., free segment maps or an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments 650b,c may receive differing portions of data from the segment 650a being cleaned.

Illustratively, segment cleaning may cause some write amplification in the storage array (SSDs). However, the file system may reduce such write amplification by writing extents to the SSDs sequentially as a log device. For example, given SSDs with an erase block size of approximately 2 MBs, by writing at least 2 MB of data (extents) sequentially to a free segment, an entire erase block may be overwritten and fragmentation at the SSD level may be eliminated (i.e., reducing garbage collection in the SSD). Yet, the SSDs typically stripe data across multiple flash components and across multiple channels (i.e., storage controllers 240) in order to realize performance. Thus, a relatively large (e.g., 1 GB) write granularity to a free (i.e., clean) segment may be necessary to avoid write amplification at the SSD level (i.e., to override internal SSD striping).

In an embodiment, because the erase block boundaries in the SSD may be unknown, the write granularity should be large enough so that a sequence of writes for extents over a large contiguous range may overwrite previously written extents on the SSD and effectively override garbage collection in the SSDs. In other words, such garbage collection may be preempted because the new data is written over the same range as previous data such that the new data completely overwrites the previously written data. This approach also avoids consuming the reserve space capacity with the new write data. Accordingly, an advantage of the log-structured feature of the storage I/O stack (i.e., log-structured layer of the file system) is the ability to reduce write amplification of the SSDs with only a minimum amount of reserve space in the SSDs. This log-structured feature effectively "moves" flash device management of reserve space from the SSD to the extent store layer, which uses that reserve space to manage the write amplification. Thus, instead of having two sources of write amplification (i.e., the extent store layer and the SSD FTL, which multiply) there is only one source of write amplification (i.e., the extent store layer).

Write Allocation

In an embodiment, there may be multiple RAID stripes per segment. Each time a segment is allocated, i.e., after cleaning the segment, the chunks of various SSDs within the segment may include a series of RAID stripes, each aligned by extent. The chunks may be at the same or different offsets within the SSDs. The extent store layer may read the chunks sequentially for cleaning purposes and relocate all the valid data to another segment. Thereafter, the chunks 620 of the cleaned segment may be freed and a decision may be rendered as to how to constitute the next segment that uses the chunks. For example, if a SSD is removed from a RAID group, a portion (i.e., a set of chunks 620) of capacity may be omitted from the next segment (i.e., change in RAID stripe configuration) so as to constitute the RAID group from a plurality of chunks 620 that is one chunk narrower, i.e., making the RAID width one less. Thus, by using segment cleaning, a RAID group of the chunks 620 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 620 from a newly introduced SSD can be added into a RAID group created when a new segment 650 is allocated.

Figure 7A:
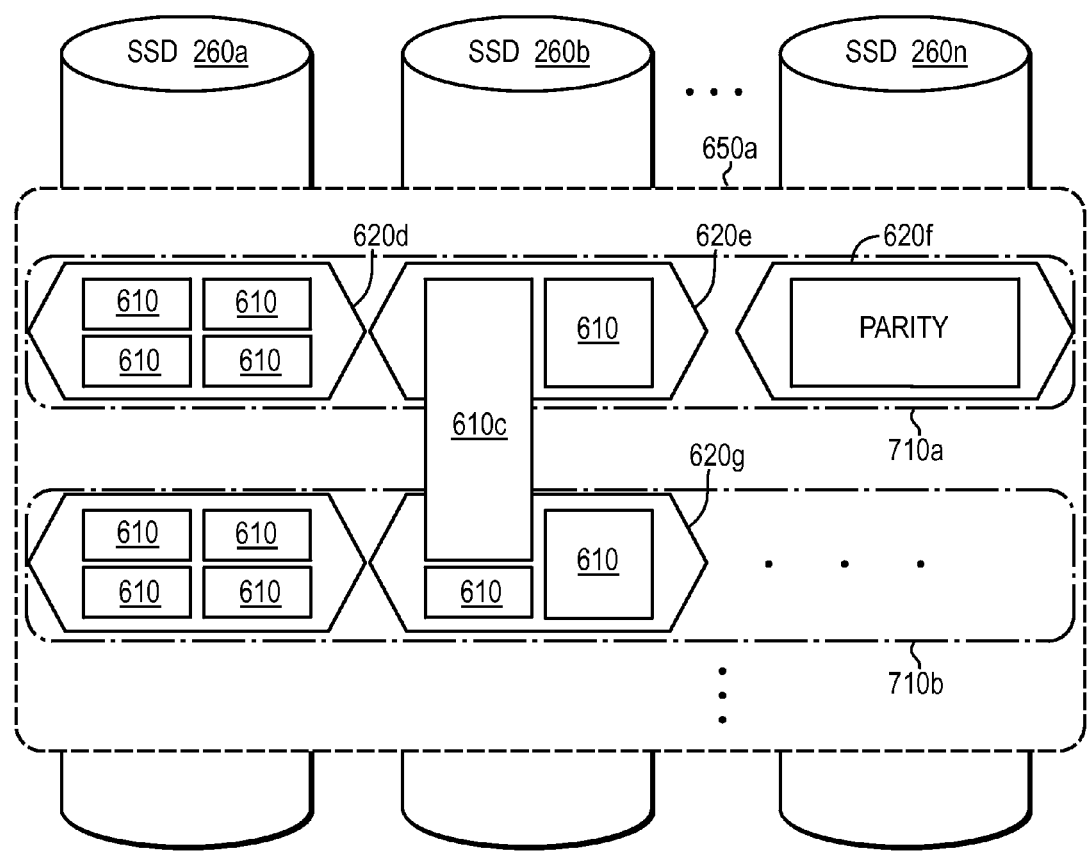
FIG. 7*a* illustrates a RAID stripe formed by the layered file system.

FIG. 7a illustrates a RAID stripe formed by the layered file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs 260a-n of the RAID group 820. To that end, the RAID layer may cooperate with the extent store layer to organize the extents as stripes 710 within the RAID group. Illustratively, the extent store layer may gather the extents 610 to form one or more full stripes 710 that may be written to a free segment 650a such that a single stripe write operation 458 may span all SSDs in that RAID group. The extent store layer may also cooperate with the RAID layer to pack each stripe 710 as a full stripe of variable-length extents 610. Once the stripe is complete, the RAID layer may pass the full stripe 710 of extents as a set of chunks 620d-f to the storage layer 365 of the storage I/O stack for storage on the SSDs 260. By writing a full stripe (i.e., data and parity) to the free segment, the layered file system avoids the cost of parity updates and spreads any required read operation load across the SSDs.

In an embodiment, an extent store instance may be viewed as a global pool of extents stored on the storage arrays 150 of the cluster, where each extent may be maintained within a RAID group 820 of an extent store. Assume one or more variable-length (i.e., small and/or large) extents are written to a segment. The extent store layer may gather the variable-length extents to form one or more stripes across the SSDs of the RAID group. Although each stripe may include multiple extents 610 and an extent 610c could span more than one stripe 710a,b, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk 620g depth). Thus, a stripe may constitute only part of the extent, so the depth of the stripe 710 (i.e., the set of chunks 620d-f constituting the stripe) may be independent of the extent(s) written to any one SSD. Since the extent store layer may write the extents as full stripes across one or more free segments of the SSDs, write amplification associated with processing information of the stripes may be reduced.

Segment-Based RAID Configuration

The embodiments described herein are directed to storing RAID-related metadata on a distributed database of the cluster (i.e., the cluster database), which is separate and apart from a storage array of SSDs configured to serve as main storage for the nodes of the cluster. The RAID-related metadata may be embodied as RAID labels (or other data structures) having configuration information that identifies one or more RAID groups associated with an extent store and storage devices, e.g., SSDs, within each RAID group. In turn, each segment of the extent store may be associated with a RAID group (and its associated data structures). Accordingly, each segment may have a different (i.e., its own) RAID configuration as the storage pool changes (i.e., addition and/or removal of SSDs).

Figure 7B:
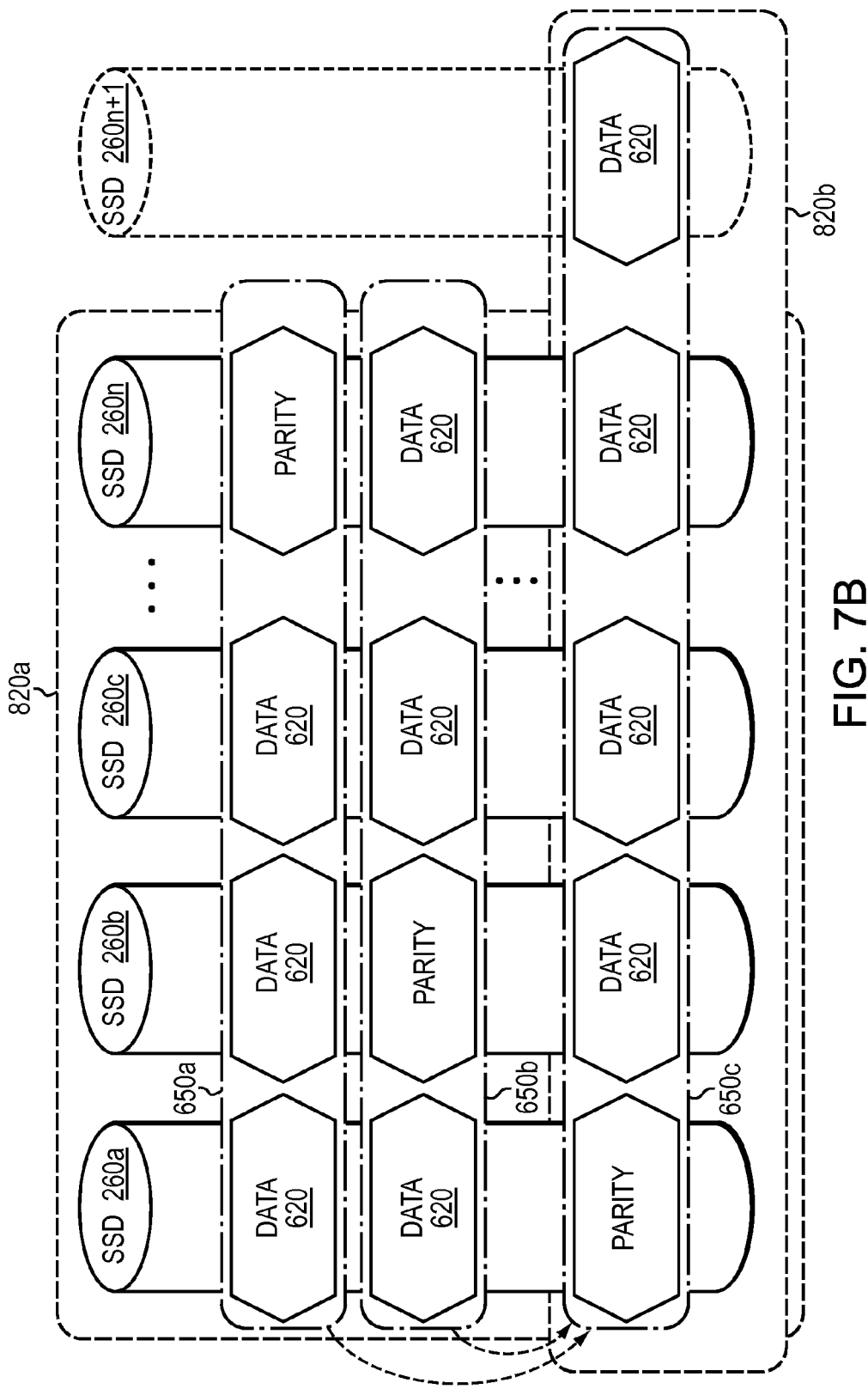
FIG. 7*b* illustrates changes to a segment-based RAID configuration in accordance with changes to a storage pool of the cluster.

FIG. 7b illustrates changes to a segment-based RAID configuration in accordance with changes to the storage pool of the cluster. Illustratively, a plurality of segments 650a,b is associated with a RAID group 820a having a set of SSDs 260a-n. A new (i.e., additional or replacement) SSD 260n+1 may be added to the storage array such that existing segments 650a,b include SSDs 260a-n, while a new segment 650c includes SSDs 260a-n in addition to SSD 260n+1. As the segments 650a,b are cleaned, data is written (i.e., moved) from those segments to the segment 650c. A new RAID group 820b may be created once new segment 650c is allocated. The layered file system may then write extents to the new segment 650c with the additional capacity available for immediate use either to recover from a degraded level of redundancy or to store additional data.

Figure 8:
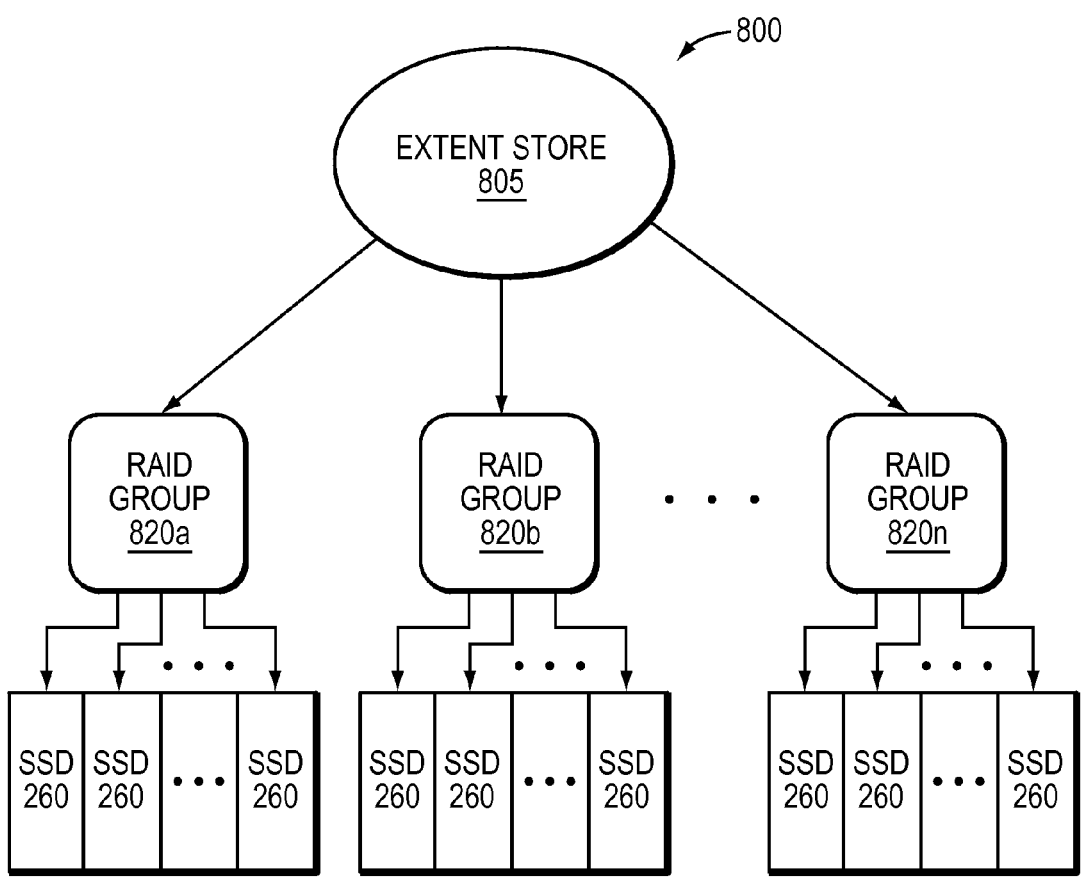
FIG. 8 illustrates a RAID configuration topology tree structure.

Each SSD may be part of a RAID configuration topology tree structure that defines an extent store using a multi-level hierarchy (e.g., three levels), wherein the first level of the tree identifies the SSD, the second level identifies the RAID group to which the SSD belongs, and the third level identifies the extent store or storage container to which the RAID group belongs. FIG. 8 illustrates a RAID configuration topology tree structure. An extent store 805 may include one or more RAID groups 820a-n, each of which may include one or more SSDs 260. Illustratively, each RAID group may be associated with at least one segment of the extent store. That is, a plurality of segments may be associated with the same RAID group, so that RAID groups may vary by segment (or remain the same), i.e., segment-based RAID configuration. Accordingly, SSDs of the storage array are assimilated into RAID groups by segment. As noted, RAID groups are illustratively created when segments are allocated.

Predictive Failure

The embodiments described herein provide a technique for predicting failure of the storage devices, e.g., the SSDs 260, of the storage array and for establishing one or more threshold conditions for replacing each of those SSDs. To that end, the predictive technique periodically monitors soft and hard failures of the SSDs, e.g., Self-Monitoring, Analysis and Reporting Technology (SMART), as well as various usage counters pertaining to I/O workloads and response times of the SSDs. A heuristic procedure may then be performed that combines the monitored results to calculate the predicted failure and recommend (e.g., via an alert) replacement of the SSDs, using the threshold conditions based on the current usage and failure patterns of the SSDs. In addition, one or more policies may be provided for replacing the SSDs of the storage array in a cost-effective manner that ensures non-disruptive operation and/or replacement of the SSDs, while obviating a potential catastrophic scenario based on the usage and failure patterns of the SSDs, e.g., deterioration of redundancy resulting in data loss. As for the latter, the predictive technique may provide a "warning" (e.g., an alert) to enable replacement of the SSDs prior to such catastrophic failure while maintaining an expected level of reliability for data stored in the storage array. That is, a schedule of staged replacement of SSDs may be provided prior to a catastrophic failure such that an expected (e.g., minimum) level of redundancy (e.g., RAID 6) is maintained for the storage array.

The predictive technique described herein may apply to any flash-based storage system where "wear-leveling" of the drives of the storage array is expected to be approximately even such that a substantial number of the drives may be expected to fail within generally the same period of time. That is, assuming all the SSDs perform according to their vendor/manufacturing specifications, the wear leveling pattern is expected to be sufficiently identical within each SSD and uniform across all the SSDs of the storage array, such that the SSDs may fail together around the same time. The technique, thus, provides preventative measures in view of observed (and reported) errors which, if not pursued, may result in an onerous situation for a system administrator or cause a catastrophic failure beyond the redundancy ability of the storage array. It should be noted that the errors observed (e.g., SMART data) in accordance with the predictive technique are SSD-based errors that facilitate the predictive analysis (i.e., predicted failure) and determinations described herein. However, it should be further noted that the predictive technique may apply to a storage system where the drives do not generally fail at the same time, e.g., storage device failure may not necessarily occur from wear leveling of the medium, but from other reasons, such as electro-mechanical failures.

Figure 9:
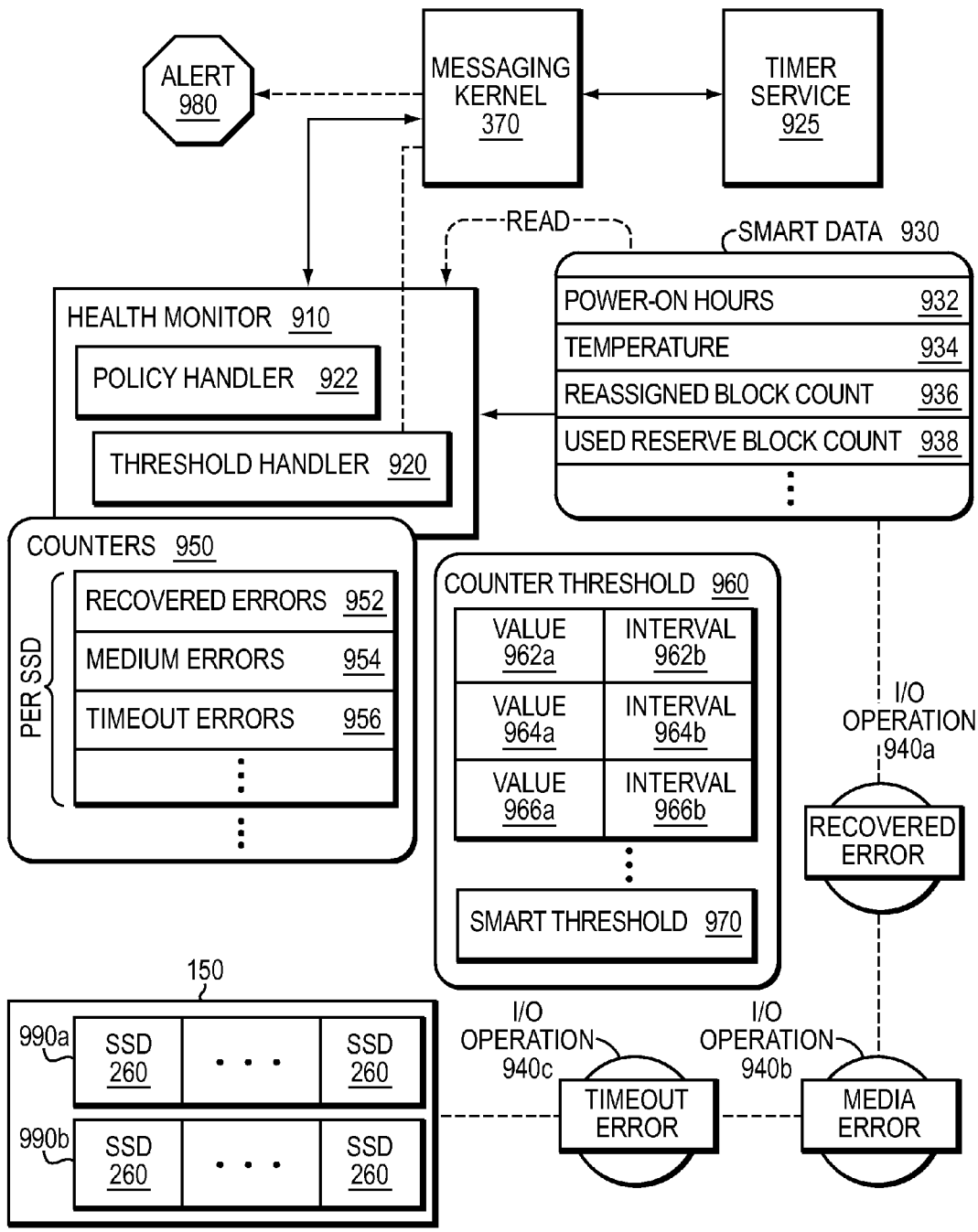
FIG. 9 is a flow diagram of a technique for predicting failure of one or more storage devices serviced by the node of the cluster.

FIG. 9 is a flow diagram of a technique for predicting failure of one or more storage devices serviced by a node of the cluster. In an embodiment, a heath monitor module (health monitor 910) of the storage I/O stack 300 executes periodically (e.g., at 10 minute intervals) to monitor the SSDs in response to a message via the messaging kernel 370 from a timer service 925. Illustratively, upon each "wakeup" (i.e., periodic execution of the health monitor), a threshold handler module (threshold handler 920) reads SMART data 930 from each SSD 260 of the storage array and executes the heuristic procedure to determine whether the respective SSD is predicted to fail. To that end, the threshold handler 920 may maintain (in memory) a set of counters 950, one for each SSD, such that during I/O operations 940a-c (e.g., SATA I/O operations over storage interconnect 140) by the storage layer 365, a number of detected errors may be recorded (i.e., counted) in the set of counters corresponding with each respective SSD based on a type of detected I/O error (e.g., SATA I/O sense code error). For example, a first type of detected I/O error (e.g., SATA I/O sense key=1 during I/O operation 940a) may be used to count (e.g., counter 952) a number of recovered errors by the SSD; a second type of detected I/O error (e.g., SATA I/O sense key=3 during I/O operation 940b) may be used to count (e.g., counter 954) a number of medium (i.e., flash component) errors by the SSD; and a third type of detected I/O error (e.g., failure of the SSD to respond within a specified time during I/O operation 940c) may be used to count (e.g., counter 956) a number of timeout errors.

As such, the heuristic procedure may compare a value of each counter 952-956 to an associated counter threshold value 962a-966a over an associated interval 962b-966b to predict failure of the corresponding SSD. If the counter exceeds the associated counter threshold over the associated interval, the corresponding SSD is predicted to fail and recommended for replacement by issuing an alert 980. For example, if the recovered errors 952 exceeds a counter threshold value 962a (e.g., 25) over an interval 962b (e.g., 10 minutes), an alert is issued to replace the corresponding SSD. Notably, multiple different counter threshold value/interval pairs may be associated with a given counter and compared by the heuristic procedure. For example, the recovered errors 952 also may be compared to a counter threshold value 964a (e.g., 100) over an interval 964b (e.g., 7 days) to predict failure of the corresponding SSD. Further, illustratively, one or more counters may be reset if no additional error associated with the counter is detected during the interval. For instance, the recovered errors counter 952 may be reset if no recovered error is detected during the interval 962b (e.g., 10 minutes). In addition, the heuristic procedure may compare certain counters (e.g., timeout errors 956) based on the type of flash components (e.g., MLC) in the SSD.

In an embodiment, the read SMART data 930 may include SMART attributes, such as power-on hours 932, indicating a count of a number of hours (minutes, or seconds) that the corresponding SSD is in power-on state; temperature 934, indicating air temperature inside a housing of the corresponding SSD; reassigned block count 936, indicating a number of defective blocks detected in the corresponding SSD; and a used reserved block count 938, indicating a number of reserved blocks used in the corresponding SSD. Illustratively, the heuristic procedure compares each read SMART data attribute 932-938 to an associated SMART threshold 970. If the attribute exceeds the associated SMART threshold (deemed a "SMART trip"), the corresponding SSD is predicted to fail and recommended for replacement by issuing an alert. Notably, the SMART thresholds may be normalized values based on characteristics (e.g., flash component type and total storage capacity) of the SSD. For example, a SMART threshold value of 8007 may be associated with the reassigned block count of a 480 GB SSD having TLC flash components. In addition, the health monitor 910 may, illustratively, power down SSDs whose power-on hours SMART attribute exceeds a fraction (e.g., 95%) of the associated SMART threshold 970 for power-on hours.

In an embodiment, the counter thresholds 960 and SMART threshold 970 are selected so that the heuristic procedure (i.e., threshold handler 920) may predict failure prior actual failure (i.e., end of life). Accordingly, the SSD predicted to fail may be placed in Read Only Service (ROS) so that extents stored on the SSD may be migrated (e.g., via segment cleaning) to another SSD in the storage array. Illustratively, the thresholds are chosen so that the predicted failure of the SSD occurs permitting a migration period (e.g., one to three months) prior to actual failure of the SSD. For example, a non-disruptive replacement of the SSDs may be performed by replacing all of the SSDs (e.g., all 24 drives) at the same time, through data migration. Data migration may be realized by cleaning segments (i.e., copying data) from one or more failing SSDs to new SSDs at once, with the goal of non-disruption to a customer. However, a new set of drives (and one or more shelves housing the drives) are provided at once with a concomitant cost. Additional storage controllers 240 as well as additional links for the storage interconnect 140 may be needed. Further, disruption (e.g., performance degradation) may occur as data on all drives (e.g., failing 24 SSDs) is migrated at once to a new set of drives (e.g., replacement 24 SSDs).

In an embodiment, a first policy implemented by a policy handler module (policy handler 922) allows for gradual (i.e., staggered) replacements of the drives. For example, if the storage array 150 has one or two shelves 990a,b of SSDs 260, it may be desirable to implement the first policy wherein data is migrated gradually to reduce performance disruptions (i.e., overhead of data migration by segment cleaning) and cost (i.e., frequent drive replacement) issues to the customer. Accordingly, a customer (i.e., administrator) may be warned (i.e., alerted) over a predetermined time window (i.e., the migration period) after the predicted failure of the SSDs, during which the customer may be directed to gradually migrate data to a new shelf. The gradual migration may be embodied as a staged (i.e., arranged) replacement policy where, e.g., one drive is replaced per week over the time window.

In an embodiment, a non-disruptive replacement of the SSDs may be performed by gradually replacing all of the SSDs (e.g., one at a time), illustratively through cleaning segments (i.e., copying data) from the one or more predictively failing SSDs to new (replacement) SSDs, with the goal of non-disruption to a customer. That is, segments on the (predictively) failing SSDs in a (potentially) failing RAID group 820 may be cleaned, thereby copying data to a second new (reliable) RAID group having the new (replacement) SSDs. Migration may be started sufficiently early so that any expected (i.e., predicted) failure of SSDs in the potentially failing RAID group does not fatally deteriorate redundancy of that RAID group during the migration. That is, for a time when a RAID group 820 is predicted to fail (i.e., migration period after a failure alert), data migration may be started, so that the migration to a new RAID group completes prior to the actual failure date. As used herein, the predicted failure (i.e., end-of-life) time of the RAID group may be a future time, after the migration period following the predicted failure alert, at which the RAID group redundancy is expected to degenerate (i.e., deteriorate) below a user-defined level of redundancy.

For example, the user may specify that a RAID group having a RAID 6 level of redundancy should not degenerate below a RAID 5 level of redundancy during a predictive drive failure migration. In this case, a single drive from the RAID group may be replaced at a time (temporarily degenerating the RAID group from RAID 6 to RAID 5) as data is migrated (i.e., segments cleaned) and full redundancy is restored (RAID 6). Accordingly, as each drive of the RAID group is replaced prior to the (original) predicted RAID group failure time, data in the replaced drives may be migrated to the replaced (new) drives. As drives are replaced and/or unexpected drive failures occur, the predicted failure time of the RAID group may be re-determined (i.e., recalculated). As a result, the interval of drive replacement may change, e.g., an original schedule of weekly drive replacement intervals may become every 3 days.

Depending on the redundancy (e.g., RAID) configuration, a second policy implemented by the policy handler 922 may leverage the fact that the storage array may sustain up to two (2) drive failures until the data of the failed drives is reconstructed on replacement drives. This second policy enables replacement of one or two SSDs at a time on the shelf. The predictive technique (which is illustratively implemented as a process of the storage layer of the storage I/O stack) cooperates with the RAID layer to reconstruct the failed drives using the storage capacity of the remaining drives. The failed drive(s) may then be replaced with the new drive(s) and reconstructed data may be migrated on to the new drive(s). Thereafter, a "planned" migration operation may be utilized for remaining drives of the shelf.

In an embodiment, a third policy implemented by the policy handler 922 may specify replacement of all the drives and an entire shelf at the same time. Here, data may be migrated from an "old" shelf to a "new" replacement shelf prior to retirement of the old shelf.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

Furthermore, it will be understood to those skilled in the art that the implementations described herein may apply to any type of special-purpose (e.g., file server, filer or storage serving appliance) or general-purpose computer, including a standalone computer or portion thereof, embodied as or including a storage system. Those of skill in the art would further appreciate that the various illustrative modules, algorithms and method steps of implementations described herein may be implemented as computer electronic hardware, computer software, or combinations of both to obtain a given functionality. Illustratively, interchangeability of hardware and software may be made to obtain the same functionality. Skilled artisans may implement the described functionality in varying ways, but such design choices should not be interpreted as causing departure from the implementations described herein.

Accordingly this description is to be taken only by way of example and not to otherwise limit the scope of the aspects of the disclosure. Therefore, it is the object of the appended claims to cover all such variations and modifications as come within the true spirit and scope of the subject matter.

What is claimed is:
1. A method comprising:
receiving a write request having data directed towards a storage container stored on a plurality of solid state storage devices (SSDs) included in a storage array connected to a node;
issuing an input/output (I/O) storage operation to store the data to a first SSD of the storage array;
in response to an I/O error detected from the I/O storage operation, incrementing a first counter in a memory included in the node, wherein the first counter is associated with a first I/O error type;

associating a set of counters with each SSD of the storage array, wherein the first counter is included in the set of counters associated with the first SSD, wherein the first I/O error type is a recovered error; and in response to the first counter exceeding a first predetermined threshold after a first periodic interval, issuing an alert to migrate the data from the first SSD to a second SSD of the storage array, and placing the first SSD into read-only service, and wherein the first predetermined threshold is chosen such that an expected failure of the first SSD occurs after a migration period for the data.

2. The method of claim 1 wherein a second counter include in the set of counters associated with the first SSD has a second I/O error type different from the first I/O error type.

3. The method of claim 2 further comprising:

determining whether the second counter exceeds a second threshold during a second periodic interval, wherein the second I/O error type is a medium error; and in response to determining that the second counter does not exceed the second threshold during the second periodic interval, determining whether the second counter exceeds a third threshold during a third periodic interval having a longer duration than the second periodic interval, wherein the third threshold is larger than the second threshold.

4. The method of claim 1 wherein the first counter is reset in response to not detecting an I/O error of the first I/O error type during a second periodic interval occurring after the first periodic interval, the second periodic interval having a same duration as the first periodic interval.

5. The method of claim 1 further comprising:

scheduling a staged replacement of the first SSD such that a minimum level of redundancy of the storage array is maintained during the migration period.

6. The method of claim 1 wherein the I/O storage operation is a write operation and wherein a storage medium of each SSD wears out after approximately a same number of write operations.

7. The method of claim 1 wherein the first SSD is powered down by the node in response to determining that an attribute of the first SSD indicates a power-on hours exceeds a power-on threshold.

8. The method of claim 1 wherein a second counter included in the set of counters associated with the first SSD is associated with a timeout error type of I/O error, and wherein the first SSD has multi-layer-cell flash components.

9. A method comprising:

receiving a write request having data directed towards a storage container stored on a plurality of solid state storage drives (SSDs) included in a storage array connected to a node;

issuing an input/output (I/O) storage operation to store the data to a first SSD of the storage array;

reading an attribute of the first SSD, wherein the attribute is selected from a group consisting of a number of defective blocks, a number of reserved blocks used, and a number of reassigned blocks; and in response to determining that the attribute exceeds a threshold, wherein the threshold is normalized based on a flash component type included in the first SSD and a storage capacity of the first SSD, issuing an alert to migrate the data from the first SSD to a second SSD of the storage array, and placing the first SSD into read-only service, and wherein the predetermined threshold is chosen such that an expected failure of the first SSD occurs after a migration period for the data.

10. A system comprising:

a node of a cluster, the node having a memory connected to a processor via a bus;

a storage array connected to the node having one or more solid state drives (SSDs);

a storage input/output (I/O) stack executing on the processor of the node, the storage I/O stack configured to:

receive a write request having data directed towards a storage container stored on the storage array;

issue an I/O storage operation to a first SSD of the storage array;

in response to an I/O error detected from the I/O storage operation, increment a first counter in the memory, wherein the first counter is associated with a first type of I/O error, and wherein the first counter is included in a set of counters associated with the first SSD, wherein the first type of I/O error is a recovered error; and in response to the first counter exceeding a first predetermined threshold after a first periodic interval, issue an alert to migrate the data from the first SSD to a second SSD of the storage array, and place the first SSD into read-only service, and wherein the first predetermined threshold is chosen such that an expected failure of the first SSD occurs after a migration period for the data.

11. The system of claim 10 wherein a second counter included in the set of counters associated with the first SSD has a second type of I/O error different from the first type of I/O error.

12. The system of claim 11 wherein the storage I/O stack is further configured to:

determine whether the second counter exceeds a second threshold during a second periodic interval, wherein the second type of I/O error is a medium error; and in response to determining that the second counter does not exceed the second threshold during the second periodic interval, determine whether the second counter exceeds a third threshold during a third periodic interval having a longer duration than the second periodic interval, wherein the third threshold is larger than the second threshold.

13. The system of claim 10 wherein the first counter is reset in response to not detecting an I/O error of the first type of I/O error during a second periodic interval occurring after the first periodic interval, the second periodic interval having a same duration as the first periodic interval.

14. The system of claim 10 wherein the storage I/O stack is further configured to:

schedule a staged replacement of the first SSD such that a minimum level of redundancy of the storage array is maintained during the migration period.

15. The system of claim 10 wherein the first SSD is powered down by the storage I/O stack in response to determining that an attribute of the SSD indicates a power-on hours exceeds a power-on threshold.

16. The system of claim 10 wherein the I/O storage operation is a write operation and wherein the storage I/O stack is further configured to:

migrate all data from a first shelf of SSDs having the first SSD to a second shelf of SSDs having the second SSD, wherein one or more flash components of each SSD of the first shelf wears out after approximately a same number of write operations.

17. The system of claim 16 wherein the migration of the data from the first shelf to the second shelf occurs during the migration period.

18. The system of claim 10 wherein the I/O storage operation is a write operation and wherein the storage I/O stack is further configured to:
- schedule a staged replacement of all SSDs included in a shelf of the storage array, wherein one or more flash components of each SSD of the shelf wears out after approximately a same number of write operations, and wherein a minimum level of redundancy of the storage array is maintained during the staged replacement of the SSDs.

* * * * *

UNITED STATES PATENT AND TRADEMARK OFFICE
CERTIFICATE OF CORRECTION

| | | |
|---|---|---|
| PATENT NO. | : 9,710,317 B2 | Page 1 of 1 |
| APPLICATION NO. | : 14/673258 | |
| DATED | : July 18, 2017 | |
| INVENTOR(S) | : Anish Gupta et al. | |

It is certified that error appears in the above-identified patent and that said Letters Patent is hereby corrected as shown below:

In the Claims

Column 20, Line 1 reads:
"only service, and wherein the predetermined threshold"
Should read:
--only service, and wherein the threshold--

Signed and Sealed this
Fifteenth Day of October, 2019

Andrei Iancu
*Director of the United States Patent and Trademark Office*